United States Patent
Roff et al.

[11] Patent Number: 5,434,940
[45] Date of Patent: Jul. 18, 1995

[54] ACTIVE FIBER NEEDLE

[75] Inventors: Robert W. Roff, Westfield; Randall B. Wilson, Maplewood, both of N.J.

[73] Assignee: The Whitaker Corporation, Wilmington, Del.

[21] Appl. No.: 217,516

[22] Filed: Mar. 24, 1994

[51] Int. Cl.[6] .............................................. G02B 6/42
[52] U.S. Cl. ......................................... 385/91; 385/35; 385/61
[58] Field of Search ................. 385/35, 61, 79, 88–94, 385/139

[56] References Cited

U.S. PATENT DOCUMENTS

| | | | |
|---|---|---|---|
| 4,033,668 | 7/1977 | Presby | 350/96 C |
| 4,418,984 | 12/1983 | Wysocki et al. | 350/96.33 |
| 4,435,038 | 3/1984 | Soes et al. | 350/96.21 |
| 4,669,820 | 6/1987 | Ten Berge | 350/96.20 |
| 4,702,547 | 10/1987 | Enochs | 385/88 |
| 4,733,933 | 3/1988 | Pikulski | 350/96.20 |
| 4,818,056 | 4/1989 | Enochs et al. | 385/94 X |
| 4,889,406 | 12/1989 | Sezerman | 385/35 |
| 4,911,519 | 3/1990 | Burton et al. | 350/96.20 |
| 4,944,569 | 7/1990 | Boudreau et al. | 350/96.20 |
| 4,979,791 | 12/1990 | Bowen et al. | 350/96.17 |
| 4,989,944 | 2/1991 | Tholen et al. | 385/35 |
| 4,997,243 | 3/1991 | Aiki et al. | 350/96.2 |
| 5,026,138 | 6/1991 | Boudreau et al. | 350/96.20 |
| 5,048,919 | 9/1991 | Ladany | 385/49 |
| 5,096,301 | 3/1992 | Stanley | 385/139 X |
| 5,247,597 | 9/1993 | Blacha et al. | 385/88 |
| 5,276,754 | 1/1994 | Blair et al. | 385/88 |

FOREIGN PATENT DOCUMENTS 0100086  7/1983  European Pat. Off.

Primary Examiner—John D. Lee
Attorney, Agent, or Firm—William S. Frances

[57] ABSTRACT

An optical connection for connecting an active optical device (6,52) or a passive optical device (41,63) to an optical fiber (3), having a thick metal coating (2) deposited circumferentially around the fiber. In this optical connection the device (6,52,41,63) is bonded to the polished endface of the fiber (5), with particular use being made of the thick metal surface (7) on the endface of the fiber. In another embodiment, the optical fiber (3) is etched to form various surfaces (31,32,33) for optical coupling. This etching also allows for accurate passive alignment of an etched active device (52) or a passive device (42,63) with the optical fiber.

17 Claims, 4 Drawing Sheets

ACTIVE FIBER NEEDLE

FIELD OF THE INVENTION

The invention relates to a novel technique for connecting a fiber optic waveguide to a passive or active optical device. Particularly, the invention relates to a thick metal circumferential coating about the fiber, whereby an active or passive device may be securely bonded and passively aligned to the endface of the metal coated fiber.

BACKGROUND OF THE INVENTION

Hermetic optical component packaging to date has employed metallic cans into which are disposed optoelectronic devices and with connections made to optical fibers. Typically, the active optoelectronic device is mounted on a submount and the submount is bonded to a metal package. Wire bonds are used to make electrical connections to wire pins which extend from a metal header. A hermetic seam seal is used to bond a metal cap to the header. Generally, the caps are lensed with a ball lens or have an ultra flat glass window or a cap with an optical fiber pigtail.

Lensed cap assemblies are commonly used in an active device mount (ADM) to effect coupling to an optical fiber. Typically, a mating connector containing an optical fiber is attached to the ADM. It is necessary to actively align the ADM and the fiber to the subassembly and then secure the assembly by welding, epoxy or soldering. This is a labor intensive procedure and furthermore there is a yield loss associated with the securing procedure, high costs associated with the packaging and an inherent complexity of the final assembly. All these factors singly and combined result in a high cost end product. Additionally, these assemblies tend to be bulky and are not readily encapsulable to form standard IC type packages.

Metallized fibers, having relatively thin metal coatings have been disclosed for example, in U.S. Pat. No. 4,033,668 to Presby, incorporated herein by reference, discloses a metalization about the circumference of the fiber. Bonding to another fiber or to a device is effected by welding or soldering in the radial direction about the outer circumference of the metalized fiber. As is shown in FIG. 6 of the '668 patent, a separate housing is required to effect coupling between the device 69 and the fiber 60. This invention then requires active alignment of the fiber to the device. This invention is inherently labor intensive and bulky in design. In U.S. Pat. No. 4,669,820 to Ten Berge, incorporated herein by reference, a metalized fiber is disclosed which allows for fiber-fiber and fiber-device coupling by crimping the metalized fiber. This invention effects fiber-device coupling via a lens as is shown in FIG. 16 of the '820 patent. This is accomplished by the disposing the fiber needle 74 and the lens 76 at opposite ends of a metal sleeve. Light from a laser is impingent on the lens for coupling to the fiber.

It is desirable to effect an accurate alignment between a fiber optic waveguide and a device without the aforementioned costs or complexities in assembly.

SUMMARY OF THE INVENTION

It is an object of this invention to provide a low cost, passively aligned connection between a fiber optic waveguide and an active optoelectronic or passive optical device. The invention makes use of a metallized optical fiber to effect bonding and alignment of a device on the endface of the fiber. The metal layer which is deposited on the optical fiber is thick, creating for example a 500 micron outer diameter on a 125 micron outer diameter optical fiber. This thick layer creates a large endface bonding surface which enables effective attachment of a device with great bond strength. By selectively etching the optical fiber, an inner diameter alignment surface is created which enables accurate alignment of the device to the optical fiber.

An advantage of this invention is to enable direct, secure bonding and alignment of passive and active optical devices to fiber optic waveguides. It is a further advantage to provide passive alignment of optical devices to fiber waveguides. It is a further advantage to provide a heat sink and electrical connection for an active device through the metallized outer surface of the fiber needle.

DETAILED DESCRIPTION

Figure 1:
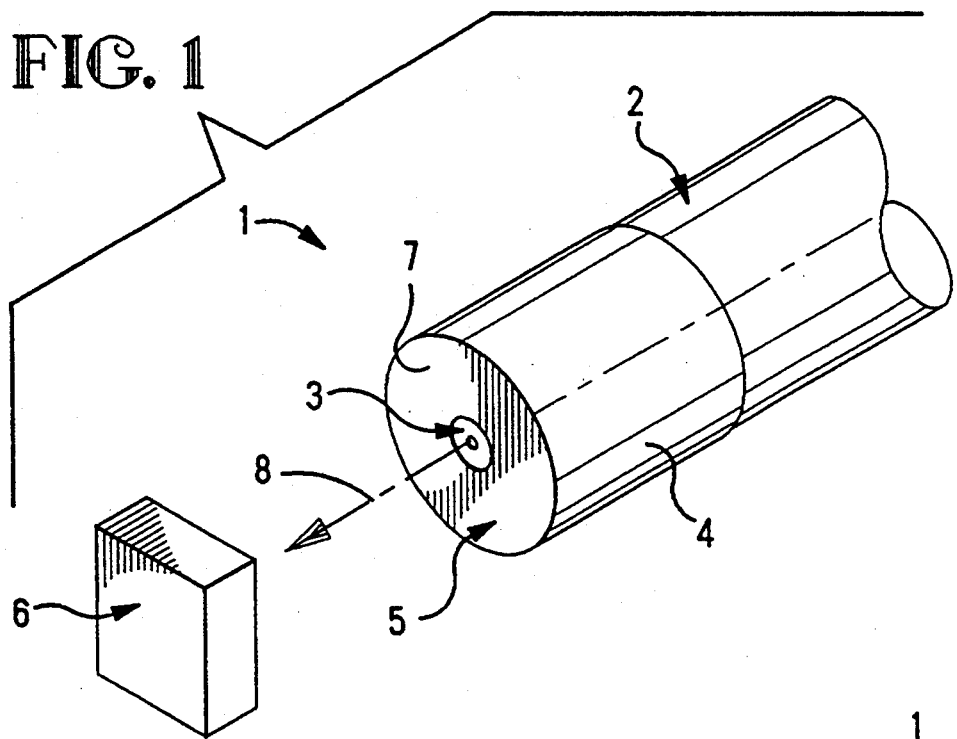
FIG. 1 is an exploded view of the fiber needle and an active optoelectronic device.

Referring to FIG. 1, a metalized fiber 1 is formed by a thick metal layer 2 disposed about the outer circumference of the optical fiber 3. The metal layer 2 is chosen to be of a thickness appropriate to effect bonding and alignment of a device to the endface of the fiber. By way of example a 540 micron outer diameter fiber needle could result from metal deposition on a 125 micron outer diameter single or multi mode fiber to effect the desired device alignment and bonding. This metal layer can be of a particular metal, an alloy or multiple layers of either. At this point the endface of the fiber 5 is polished to form a good surface for bonding and coupling an optical device 6 to the endface 5 of the fiber needle. The resulting fiber, known as a fiber needle, is then electroplated with a thin layer of gold 4 (approximately 5 microns) on the metal portion of the endface alone or on the metal portion of the endface and about the circumference of the fiber needle down a short length of the needle. The device 6 is then bonded to the to the endface 5 making use of the metalized surface 7 which lies in a plane normal to the axis 8 of the metalized fiber 1. The bonding of the device is effected by conventional techniques, such as, but not limited to, application of solder by use of a preform or by plating directly to the endface and/or device or by conventional tinning methods. The solder can be any conventional eutectic solder. Finally, either conductive or non-conductive epoxy attachment methods can be utilized. As can be readily understood from the above description and by reference to FIG. 1, an Active Fiber Needle employs a thick metal coating on an optical fiber to form an extended endface surface on which an active or passive device can be passively aligned and bonded. This differs dramatically in result from inventions such as disclosed in U.S. Pat. No. 4,033,668 as discussed supra, for example. Inventions like that disclosed in the '668 patent make use of a thin metal coating deposited circumferentially about the fiber to effect a bond along the direction perpendicular to the unit radial direction of the metalized fiber assembly. The present invention exploits the metalized surface to effect bonding to devices where the bonding is along the direction perpendicular to the unit axial direction. The only way to effect a secure bond and passive alignment with the metalized fiber of the present invention is to make the metal layer of the fiber sufficiently thick to have ample area on the endface of the fiber needle to bond. Clearly a major distinction between bonding as disclosed in the '668 patent and as disclosed in the present invention is that in the present invention very efficient coupling and stable passive alignment between the device and the fiber occurs because of the close proximity that is realized.

Figure 2A:
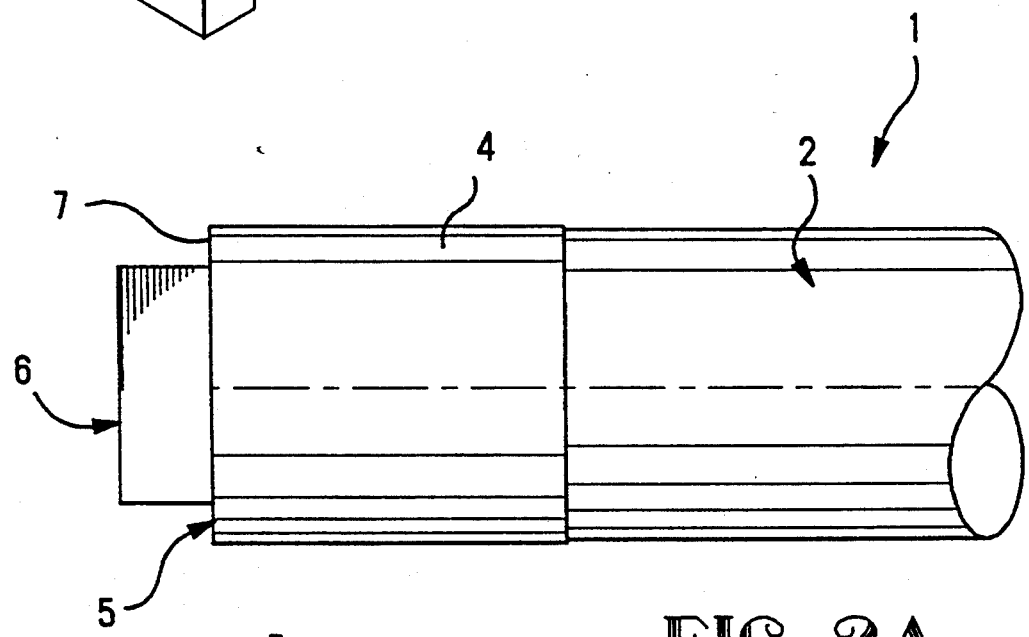
FIGS. 2A and 2B show an active device bonded to and aligned with the fiber needle.
Figure 2B:
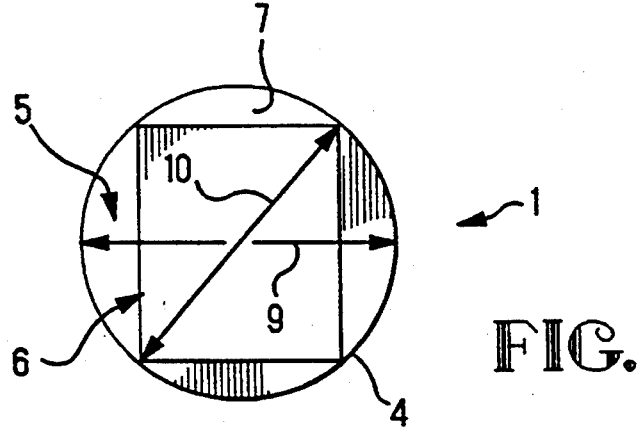

Turning now to the aspects of the invention dealing with passive alignment, we turn to FIGS. 2A and 2B, where we see that the semiconductor device 6, in this case an LED or PIN, is substantially rectangular and is bonded to the polished fiber endface 5 via the metalized surface 7. In anticipation of using the device bonded to the fiber (conveniently referred to as the active fiber needle) in a packaged component such as a common IC package, it is important to maintain the bonded device within the profile of the fiber needle. This is effected by sizing the optical needle face diameter 9 to equal the length of the diagonal of the semiconductor die 10. In the present case the semiconductor device measured 381×381 microns. The optimized outer diameter of the optical needle would thereby be approximately 540 microns. Obviously, the 500 micron diameter fiber needle could be the measure, and the semiconductor die could then be chosen to fit properly on the face. Finally, this type of passive alignment is achieved by visually aligning a rectangular structure within a circular structure, where the equating of the diameter of the fiber needle with the diagonal of the semiconductor die proves to be an excellent alignment scheme using conventional die placement equipment. It is critical that the device diagonal size not be appreciably smaller than the fiber needle diameter or this ease of alignment will not be effected.

Another way of effecting passive alignment utilizes surface tension of the bonding material. By choosing the size of the die diagonal and the needle diameter such that a distinct minimum surface energy of the molten bonding material is achieved when the device and the fiber are optically aligned. This is achieved by having a characteristic length of the metal bonding surfaces of the die and the needle be of the same dimension. Any displacement of the aligned position would then increase the surface tension and a restoring force thus created. The system would then relax to a state of minimum energy where optical alignment is achieved by design. This method is known for its use in aligning chips to circuit traces on a circuit board.

Figure 3A:
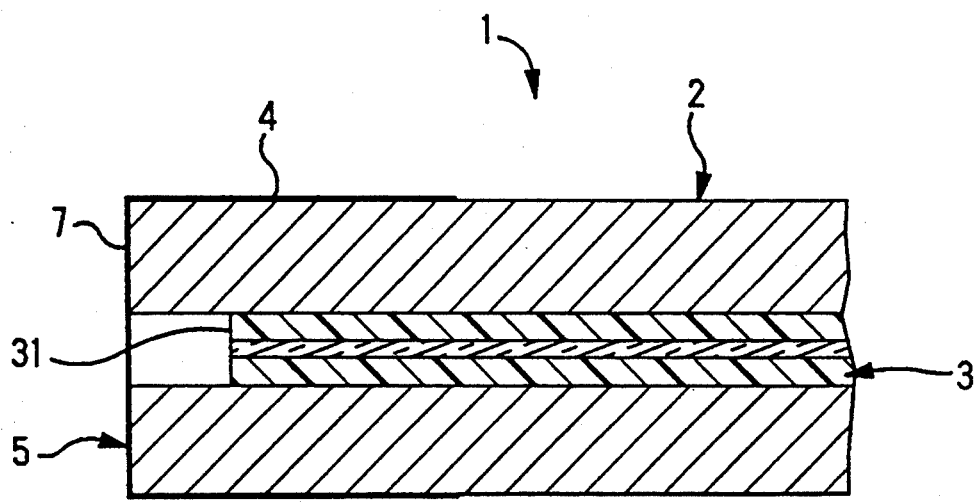
FIGS. 3A, 3B and 3C show the various inner diameter etched surfaces of the optical fiber.
Figure 3B:
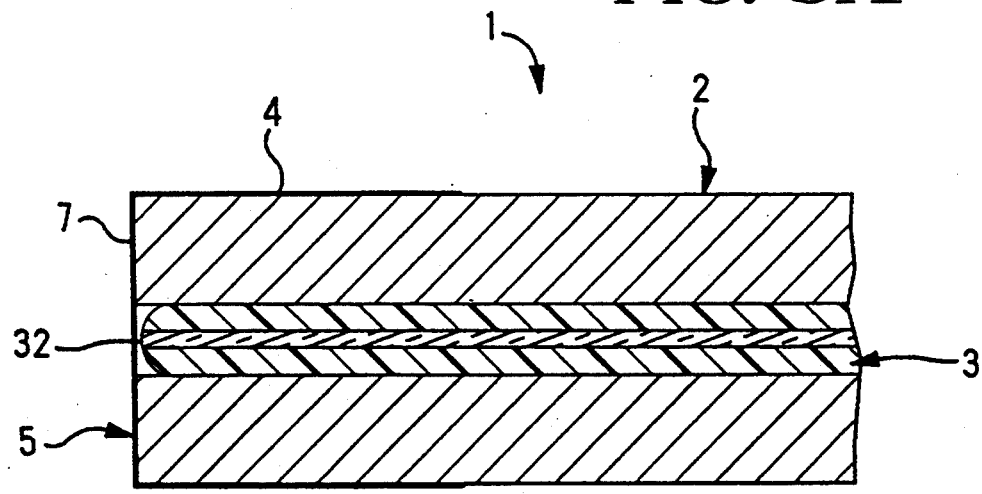
Figure 3C:
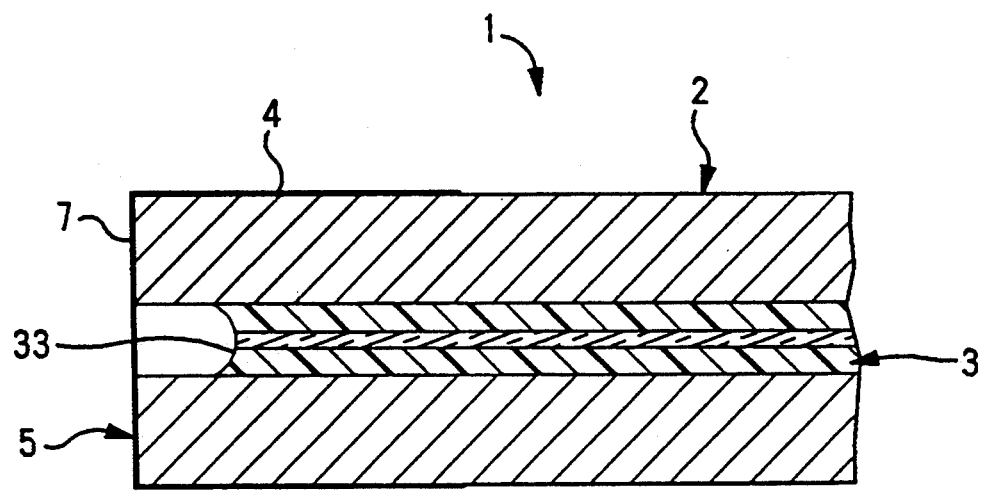
Figure 5A:
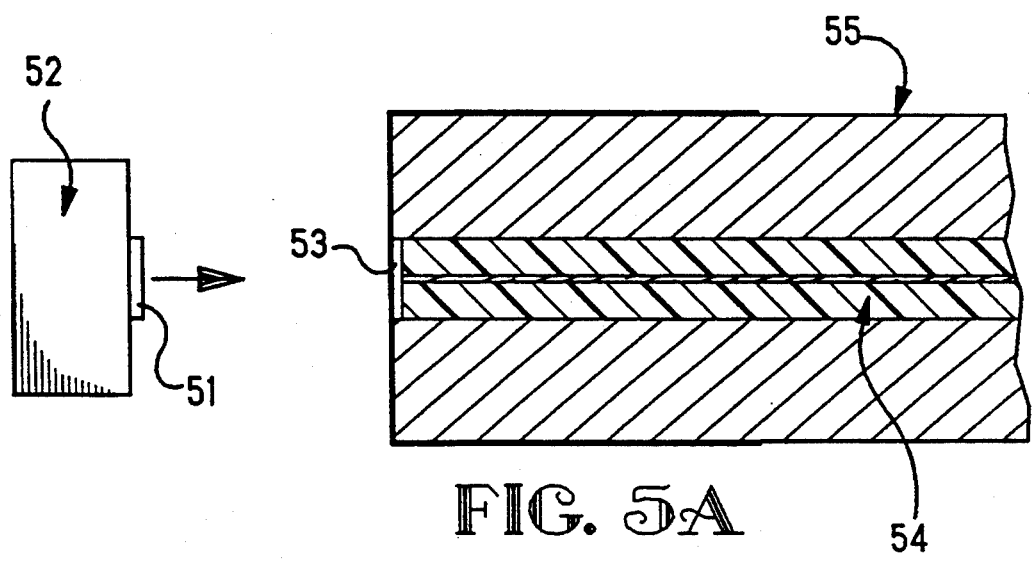
FIGS. 5A and 5B show an active device etched to conform to the etched inner diameter etched surface to effect passive alignment. The device and fiber needle are shown uncoupled as well as coupled for clarity.
Figure 5B:
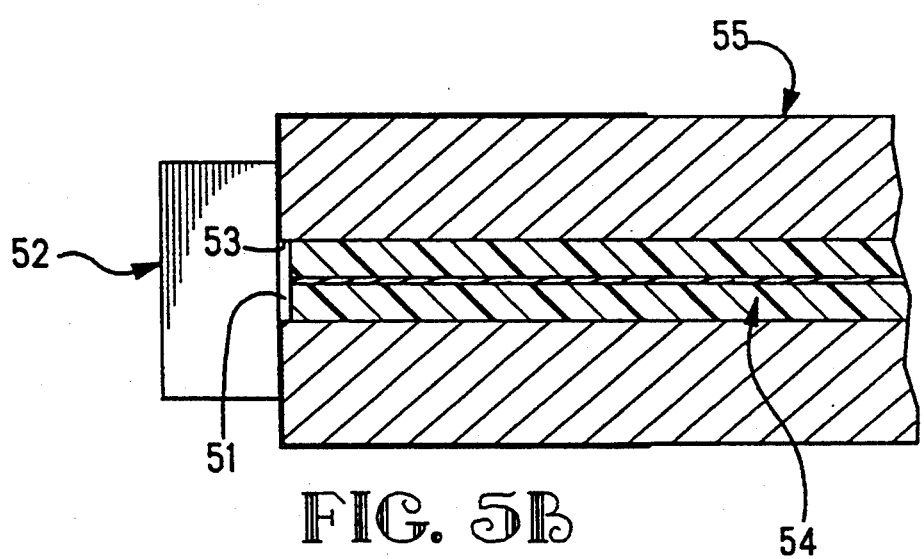

An alternative method to passive alignment can be employed in the alignment of both active and passive devices. As is shown in FIGS. 3A, 3B and 3C, the optical fiber can be etched and thereby a recess formed in the fiber needle which serves to align a device with the optical fiber by various means. As is seen in FIGS. 3A, 3B and 3C, the invention contemplates the etching of a flat surface 31, a convex surface 32 and a concave surface 33 at the end of the fiber for various applications. The etching of the fiber is effected by conventional techniques, for example by the use of a 30% solution of HF for a prescribed time for a given desired result. The use of a concave surface enables a focused one-to-one image of the laser spot (via a spherical lens as is described below) to be expanded out into the core of the optical refraction by the concave surface, thus matching the acceptance angle of the fiber. A convex surface could achieve the required mode matching provided the active device is mounted with requisite proximity to the convex surface. Once the fiber is etched and the desired fiber endface formed, the device is passively aligned and mounted in the cavity formed by the etching and bonded to the endface by one of the methods described above. In the case of an active device, the device is etched such that a protrusion 51 is formed on the device 52 to complement the size of the opening 53 formed by the etching of the fiber 54 within the fiber needle 55. This is seen in FIGS. 5A and 5B. This type of alignment eliminates the misalignment of a device submount. Finally, it is important to note that the active device could be an optical detector, an optical source or an optical modulator. Further the optical source device could be an edge or surface emitter. The devices are contemplated to be an LED, a PIN detector, a heterojunction laser and a Vertical Cavity Surface Emitting Laser (VCSEL). The passive devices are contemplated to be a focusing element, a filter, a holographic optical element (HOE) or a microlens. The active and passive devices above mentioned are representative and not intended in any way to be limiting.

Figure 4:
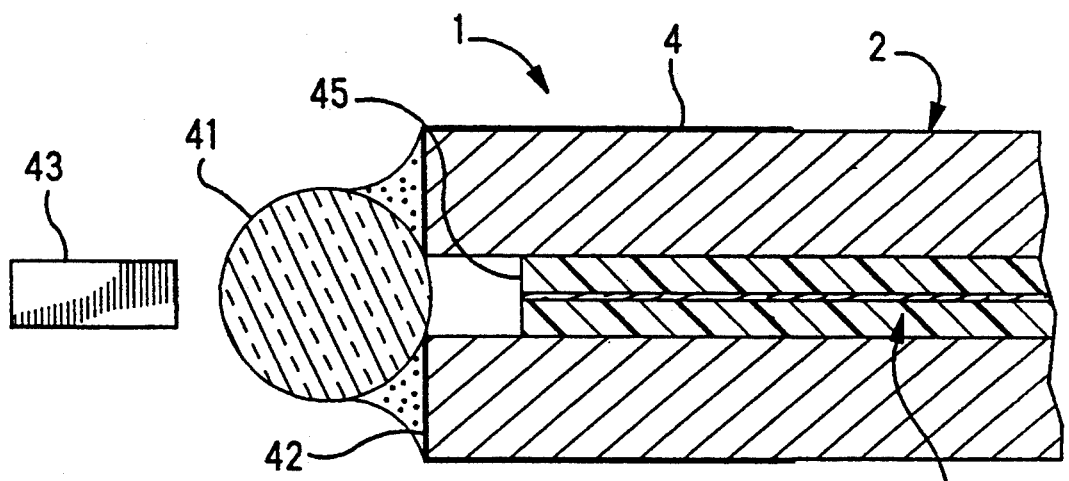
FIG 4 shows a spherical lens bonded to the etched endface of the fiber needle.
Figure 6:
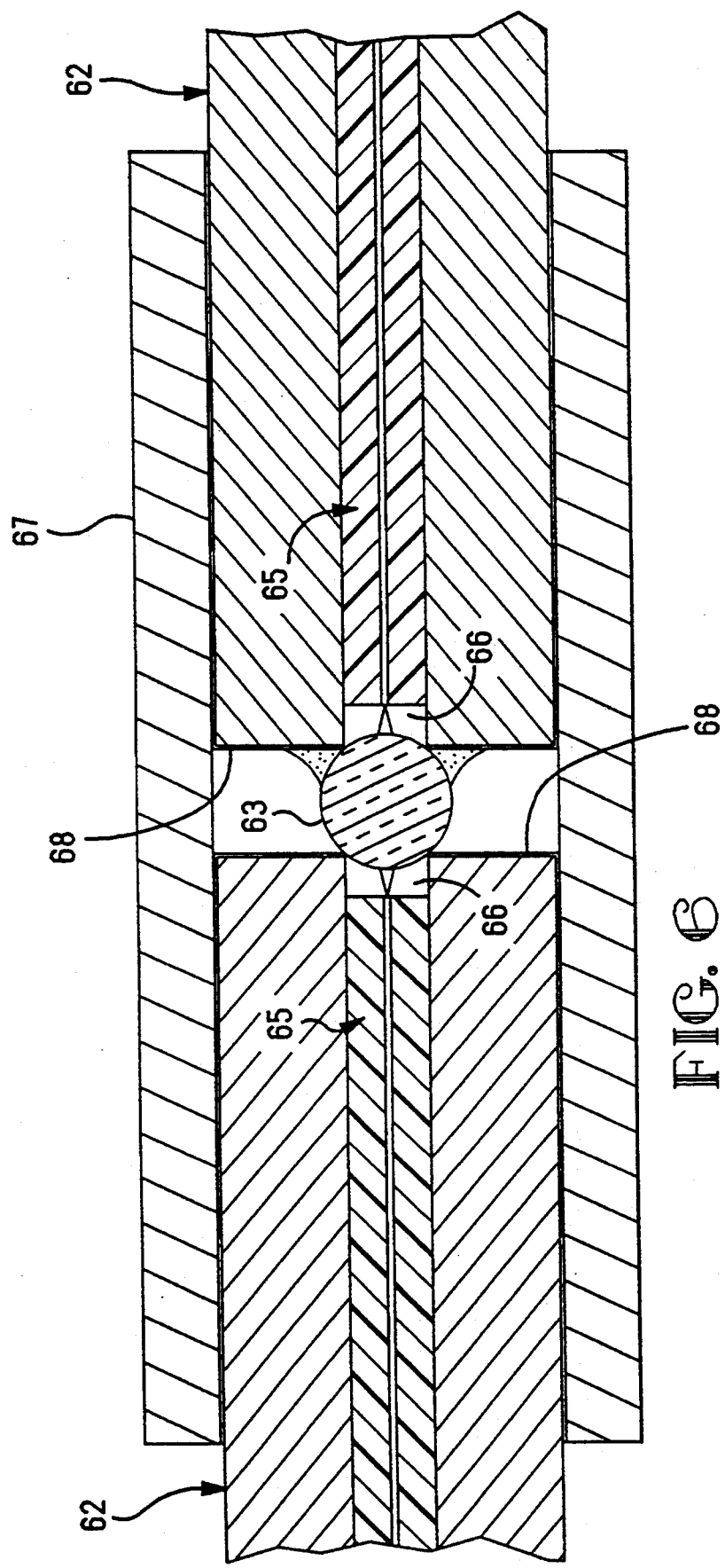
FIG. 6 shows a spherical lens mounted between two fiber needles to effect coupling therebetween.

The alignment of a spherical lens is shown in FIG. 4. In this case a lens 41 is mounted on the end of the fiber needle 42 to perform emission-mode matching between a device 43 and the fiber 44. This approach would be employed to couple a laser device to a single mode fiber where a magnification of the laser image of approximately four times is required for high power coupling. For example, if the light source were an edge-emitting laser with full-width half-maximum power as the chosen output, the output angle of the device is approximately 26 degrees. The acceptance angle of a typical single mode fiber is approximately six degrees, and thereby the lens has to reduce the beam angle of the laser by a factor of about four to effect the desired coupling. To achieve a secure bonding of the lens to the fiber as well as accurate alignment of the lens to the fiber, the optical fiber is etched back from the end surface by applying a solution of 30% HF for approximately 13 minutes. This results in an etching of the fiber back from the endface of the fiber needle, forming a recess that acts as a seat for a spherical lens 41. While the etched surface 45 in FIG. 4 is shown as being flat, the invention contemplates etching curved surfaces as described previously to effect maximum coupling. This results in a good alignment and coupling between the fiber and the lens, due to the inherent self-centering of the lens over the core of the optical fiber. Particularly, the lens element 41 is aligned to the fiber core to a tolerance as good as the core to cladding concentricity of the optical fiber. This occurs because the seating surface is formed directly by the cladding diameter of the fiber. The lens may then be attached by standard attachment techniques with any stable adhesive. Finally, as shown in FIG. 6, a pair of etched fiber needles 62 are shown disposed on either side of a spherical lens 63 which couples light between the fibers. The etched fibers 65 form recesses 66 in the endfaces of the fiber needles which serve as alignment surfaces for the lens. The curvature of the lens 63 holds the endfaces 68 of the mating needles in positional alignment and a bore element or angular alignment sleeve 67 serves to hold the needles in angular alignment. It is important to recognize that while a spherical lens is shown in FIG. 6, a holographic optical element, binary optic or other lensing device could be bonded to the endface of the fiber needle for various applications.

This invention has been described in detail with reference to certain preferred embodiments. It is understood that variations and modifications can be effected within the spirit and scope of the invention.

We claim:
1. An optical connection, comprising:
   (a). A substantially cylindrical optical fiber having a first end and a second end, with an optic axis disposed along the center of said optical fiber between said ends;
   (b). a metallic surface of a prescribed thickness disposed circumferentially about said optical fiber;
   (c). a first face at said first end and a second face at said second end, said ends substantially orthogonal to said optic axis; and
   (d). an optoelectronic device bonded to said first face, whereby light impingent on or transmitted from said device is propagated through said optical fiber.
2. An optical connection as recited in claim 1, wherein said optoelectronic device is bonded by soldering said device to said metallic surface on said first face of said optical fiber.
3. An optical connection as recited in claim 1, wherein said optoelectronic device is bonded by applying adhesive to said device and said first face of said optical fiber.
4. An optical connection as recited in claim 1, wherein said optoelectronic device is substantially rectangular and has a diagonal dimension substantially equal to the diameter of said optical fiber with said metallic surface disposed thereon.
5. An optical connection as recited in claim 1, wherein said metallic surface of said optical fiber provides an electrical contact for said optoelectronic device.
6. The optical connection as recited in claim 1, wherein joule heating from said optoelectronic device is dissipated through said metallic surface of said optical fiber.
7. An optical connection, comprising:
   (a). A substantially cylindrical optical fiber having a first end and a second end, with an optic axis disposed along the center of said optical fiber between said ends;
   (b). a metallic surface of a prescribed thickness disposed circumferentially about said optical fiber;
   (c). a first face at said first end and a second face at said second end substantially orthogonal to said optic axis; and
   (d). a passive optical device bonded to said first face, whereby light impingent on or transmitted from said device is propagated through said optical fiber.
8. An optical connection as recited in claim 7, wherein said optical fiber is etched at said first end to form a concave surface on said first face of said fiber.
9. An optical connection as recited in claim 8, wherein said passive optical device is a spherical lens mounted such that said lens is centered relative to said concave surface, whereby accurate optical alignment of said device to said fiber is effected.
10. An optical connection as recited in claim 7, wherein said optical fiber is etched at said first end to form a convex surface on said first face of said fiber.
11. An optical connection as recited in claim 7, wherein said optical fiber is etched at said first end to form a substantially flat surface on said first face of said fiber.
12. An optical connection, comprising:
    (a). A first substantially cylindrical optical fiber having a first end and a second end, with an optic axis disposed along the center of said optical fiber between said ends;
    (b). a metallic surface of a prescribed thickness disposed circumferentially about said first optical fiber;
    (c). a first face at said first end of said first fiber and a second face at said second end of said first fiber, said faces substantially orthogonal to said optic axis;
    (d). a second substantially cylindrical optical fiber having a first end and a second end, with an optic axis disposed along the center of said optical fiber between said ends;
    (e). a metallic surface of a prescribed thickness disposed circumferentially about said second optical fiber;
    (f). a first face at said first end of said second fiber and a second face at said second end of said second fiber, said faces substantially orthogonal to said optic axis; and
    (g). a passive optical device mounted between said first face of said first optical fiber and said first face of said second optical fiber, whereby light propagating in one of said optical fibers is coupled to the other of said optical fibers.
13. An optical connection as recited in claim 12, wherein said first face of said first and said second optical fibers are etched to form concave surfaces thereon.
14. An optical connection as recited in claim 13, wherein said passive optical device is a spherical lens mounted between said first faces of said first and second optical fibers, such that said lens is centered relative to said concave surfaces, whereby accurate optical alignment of said device to said fibers is effected.
15. An optical connection as recited in claim 12, wherein said first face of said first and said second optical fibers are etched to form convex surfaces thereon.
16. An optical connection as recited in claim 12, wherein said first face of said first and said second optical fibers are etched to form substantially flat surfaces thereon.
17. An optical connection, comprising:
    (a). A substantially cylindrical optical fiber having a prescribed outer diameter, said optical fiber having a first end and a second end, with an optic axis disposed along the center of said optical fiber between said ends;
    (b). a metallic surface of a prescribed thickness disposed circumferentially about said optical fiber, said metallic surface having an inner diameter substantially equal to said outer diameter of said optical fiber;

(c). an optoelectronic device having a light-emitting or light-receiving side, said light-emitting or light-receiving side etched to form a substantially cylindrical protrusion on said light emitting side or said light receiving side, said protrusion having a diameter substantially equal to said inner diameter of said metallic surface; and (d). at least face of said optical fiber being etched to form a recess for receiving said protrusion of said optoelectronic device, whereby said optoelectronic device is mounted in said recess and aligned with said optical fiber.

* * * * *